(12) United States Patent
Johnson, III

(10) Patent No.: US 10,519,055 B1
(45) Date of Patent: Dec. 31, 2019

(54) AEROBIC WASTEWATER TREATMENT SYSTEMS AND METHODS OF FABRICATION

(71) Applicant: George E. Johnson, III, Downsville, LA (US)

(72) Inventor: George E. Johnson, III, Downsville, LA (US)

( * ) Notice: Subject to any disclaimer, the term of this patent is extended or adjusted under 35 U.S.C. 154(b) by 0 days.

(21) Appl. No.: 16/025,484

(22) Filed: Jul. 2, 2018

(51) Int. Cl.
*C02F 3/20* (2006.01)
*B01D 21/00* (2006.01)
*B01D 21/02* (2006.01)
*C02F 1/00* (2006.01)

(52) U.S. Cl.
CPC ............. *C02F 3/20* (2013.01); *B01D 21/003* (2013.01); *B01D 21/02* (2013.01); *C02F 2001/007* (2013.01); *C02F 2203/006* (2013.01)

(58) Field of Classification Search
CPC .. C02F 3/1242; C02F 3/20; C02F 3/12; C02F 3/1247; C02F 2203/006; C02F 3/02; C02F 3/121; B01D 21/02; B01D 21/003; B01D 21/0003; B01D 21/0042
USPC .......... 210/207, 170.08, 205, 256, 620, 628; 137/576
See application file for complete search history.

(56) References Cited

U.S. PATENT DOCUMENTS

| | | | | |
|---|---|---|---|---|
| 3,173,866 A | * | 3/1965 | Lefton .................. | C02F 3/12 210/205 |
| 4,834,879 A | * | 5/1989 | Stegall ................ | C02F 3/1242 210/205 |
| 5,162,083 A | * | 11/1992 | Forbes .................. | C02F 3/1242 210/199 |
| 5,785,854 A | | 7/1998 | McKinney | |
| 6,406,619 B1 | * | 6/2002 | Donald ................. | C02F 3/1242 210/151 |
| 6,827,850 B2 | | 12/2004 | Donald et al. | |
| 7,077,952 B2 | | 7/2006 | Burks | |
| 7,178,677 B1 | | 2/2007 | McKinney | |
| 7,186,330 B2 | | 3/2007 | McKinney | |
| 7,294,260 B2 | | 11/2007 | McKinney | |
| 7,513,994 B2 | | 4/2009 | McKinney | |
| 7,651,608 B2 | | 1/2010 | McKinney | |
| 7,837,867 B2 | | 11/2010 | McKinney | |

(Continued)

*Primary Examiner* — Claire A Norris
(74) *Attorney, Agent, or Firm* — R. Keith Harrison

(57) ABSTRACT

Aerobic wastewater treatment systems may include a treatment tank having a tank interior. An aeration chamber may be provided in the tank interior. A wastewater inlet conduit may be disposed in fluid communication with the aeration chamber. An air inlet conduit may be disposed in fluid communication with the aeration chamber. A diffuser may be provided in the aeration chamber. The diffuser may be disposed in pneumatic communication with the air inlet conduit. A clarifier in the tank interior may include a vertical outside clarifier wall portion. An inside clarifier wall portion may be disposed at an acute angle to the outside clarifier wall portion. A clarifier interior may be formed by and between the outside clarifier wall portion and the inside clarifier wall portion. A clarifier inlet may establish fluid communication between the aeration chamber and the clarifier interior. An effluent outlet conduit may be disposed in fluid communication with the clarifier interior. Aerobic wastewater treatment system fabrication methods are also disclosed.

20 Claims, 11 Drawing Sheets

(56) References Cited

U.S. PATENT DOCUMENTS

| | | |
|---|---|---|
| 8,137,557 B2 | 3/2012 | Ladouceur |
| 8,371,826 B1 | 2/2013 | Johnson et al. |
| 8,940,171 B2 | 1/2015 | Shechter et al. |
| 2007/0017857 A1 | 1/2007 | McKinney |
| 2009/0008311 A1 | 1/2009 | Lee |
| 2011/0186491 A1 | 8/2011 | McKinney |
| 2015/0108052 A1 | 4/2015 | Shechter et al. |
| 2016/0376176 A1 | 12/2016 | Hamidyan |
| 2017/0152168 A1 | 6/2017 | Cloete et al. |
| 2017/0291837 A1 | 10/2017 | Emr |

* cited by examiner

AEROBIC WASTEWATER TREATMENT SYSTEMS AND METHODS OF FABRICATION

FIELD

Illustrative embodiments of the disclosure generally relate to wastewater treatment systems. More particularly, illustrative embodiments of the disclosure relate to aerobic wastewater treatment systems having enhanced wastewater treatment efficiency and methods of fabrication thereof.

SUMMARY

Illustrative embodiments of the disclosure are generally directed to aerobic wastewater treatment systems having enhanced wastewater treatment efficiency. The aerobic wastewater treatment systems may include a treatment tank having a tank interior. An aeration chamber may be provided in the tank interior. A wastewater inlet conduit may be disposed in fluid communication with the aeration chamber. An air inlet conduit may be disposed in fluid communication with the aeration chamber. A diffuser may be provided in the aeration chamber. The diffuser may be disposed in pneumatic communication with the air inlet conduit. A clarifier in the tank interior may include a vertical outside clarifier wall portion. An inside clarifier wall portion may be disposed at an acute angle to the outside clarifier wall portion. A clarifier interior may be formed by and between the outside clarifier wall portion and the inside clarifier wall portion. A clarifier inlet may establish fluid communication between the aeration chamber and the clarifier interior.

Illustrative embodiments of the disclosure are further generally directed to aerobic wastewater treatment system fabrication methods. The aerobic wastewater treatment system fabrication methods may include fabricating a treatment tank and a tank cover on the treatment tank, installing an air inlet conduit in the treatment tank, installing a diffuser in a tank interior of the treatment tank, installing a wastewater conduit in the treatment tank, lowering a clarifier in place in the tank interior of the treatment tank, placing an outside wall portion of a clarifier wall of the clarifier against an interior surface of the tank sidewall, aligning or registering an effluent conduit opening in the outside wall portion of the clarifier wall with an effluent outlet conduit opening in the tank sidewall of the treatment tank and extending an outlet portion of an effluent outlet conduit through an effluent conduit opening in the outside wall portion of the clarifier wall and the effluent outlet conduit opening in the tank sidewall of the treatment tank.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
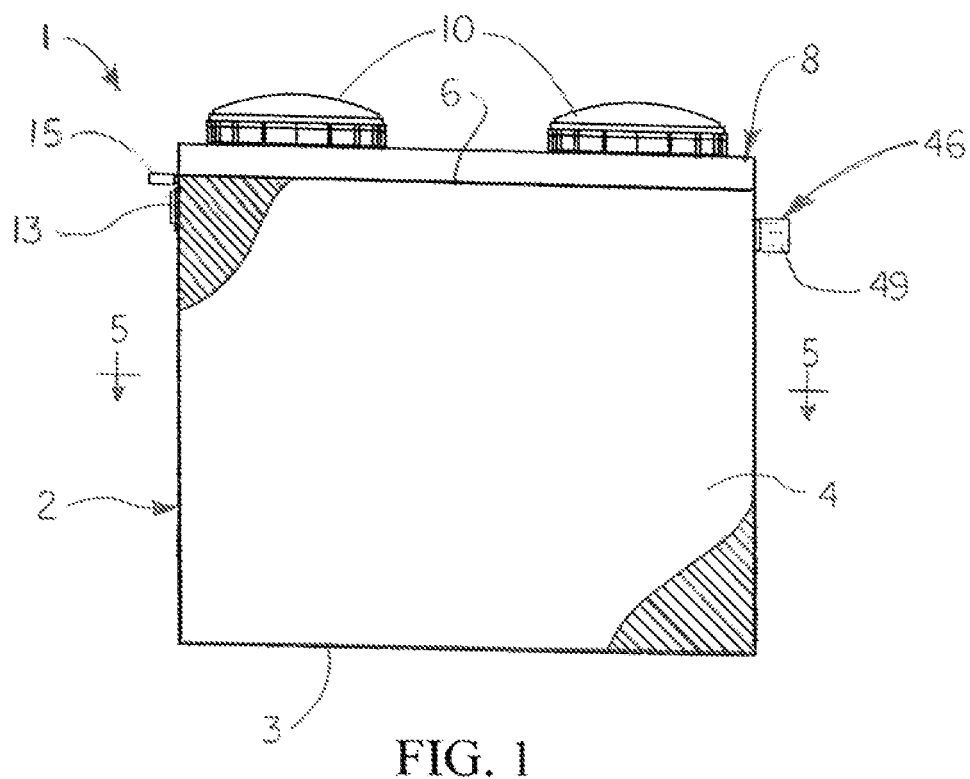
FIG. 1 is a side view of an illustrative embodiment of the aerobic wastewater treatment systems.
Figure 2:
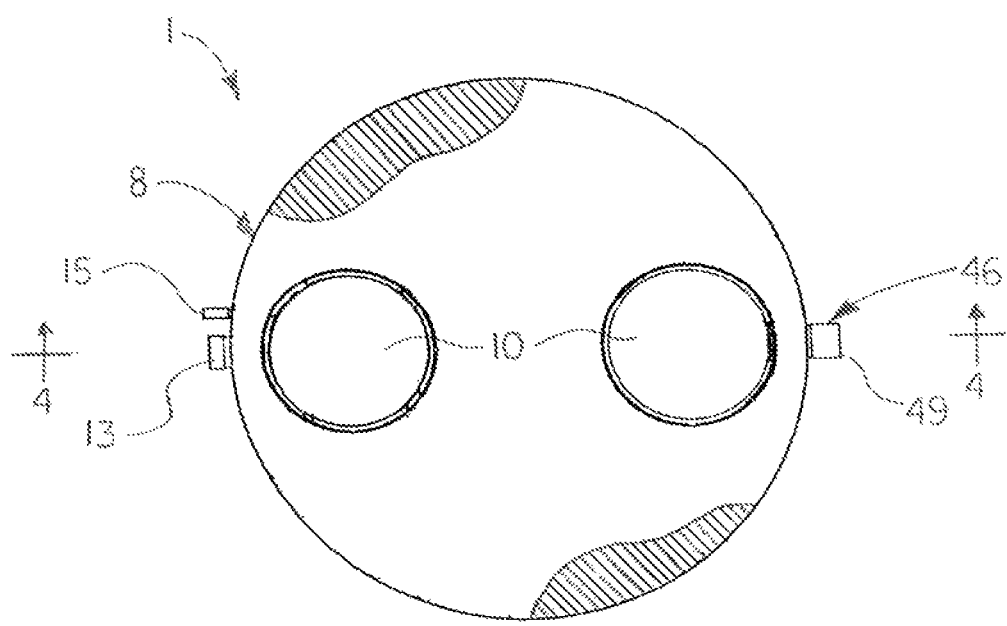
FIG. 2 is a top view of the illustrative aerobic wastewater treatment system.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 13:
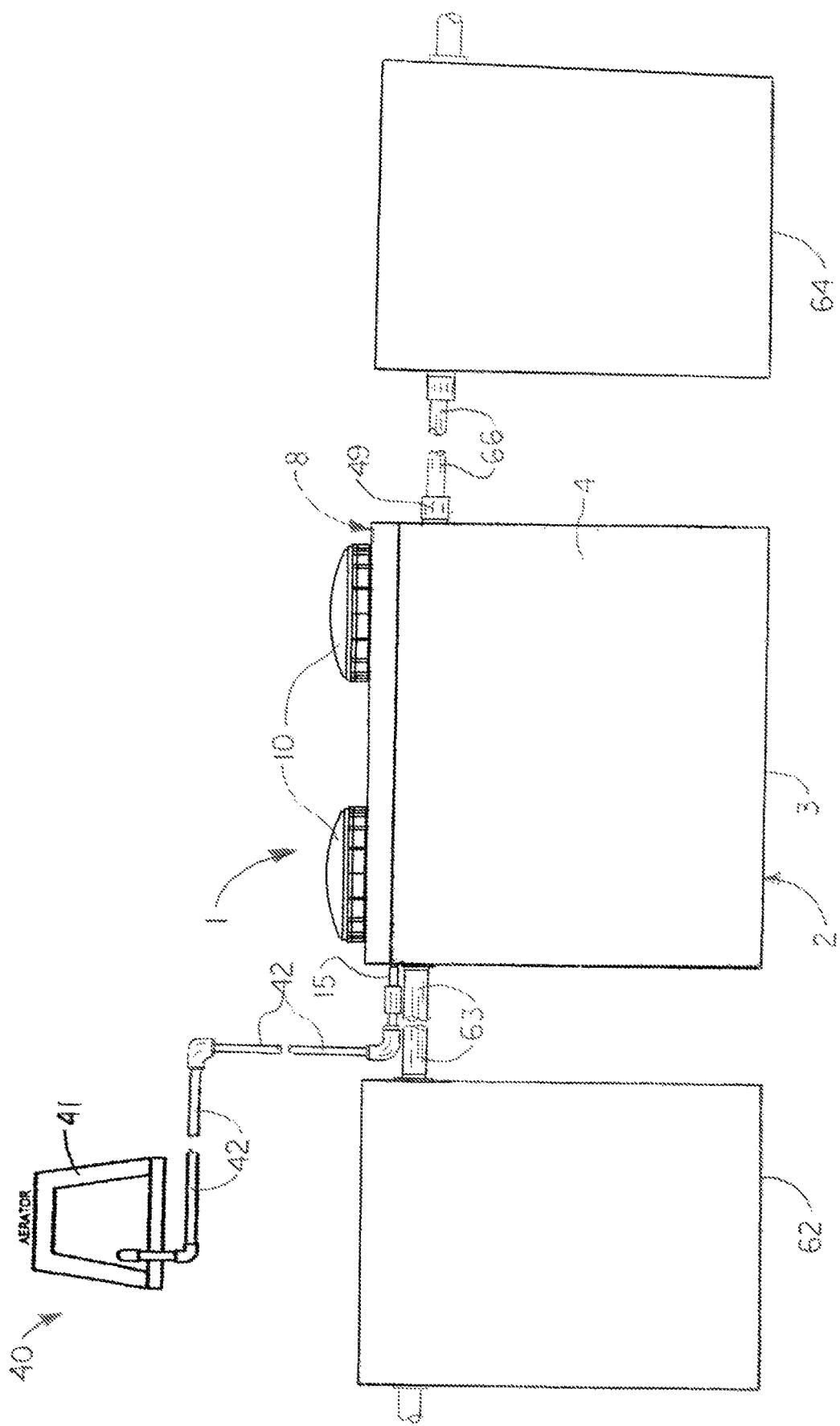
FIG. 13 is a front view, partially in section, of a typical water treatment system having a pretreatment tank, a post-treatment tank and the aerobic wastewater treatment system connected to the pretreatment tank, the post-treatment tank and an aerator in typical application of the aerobic wastewater treatment system.
Figure 14:
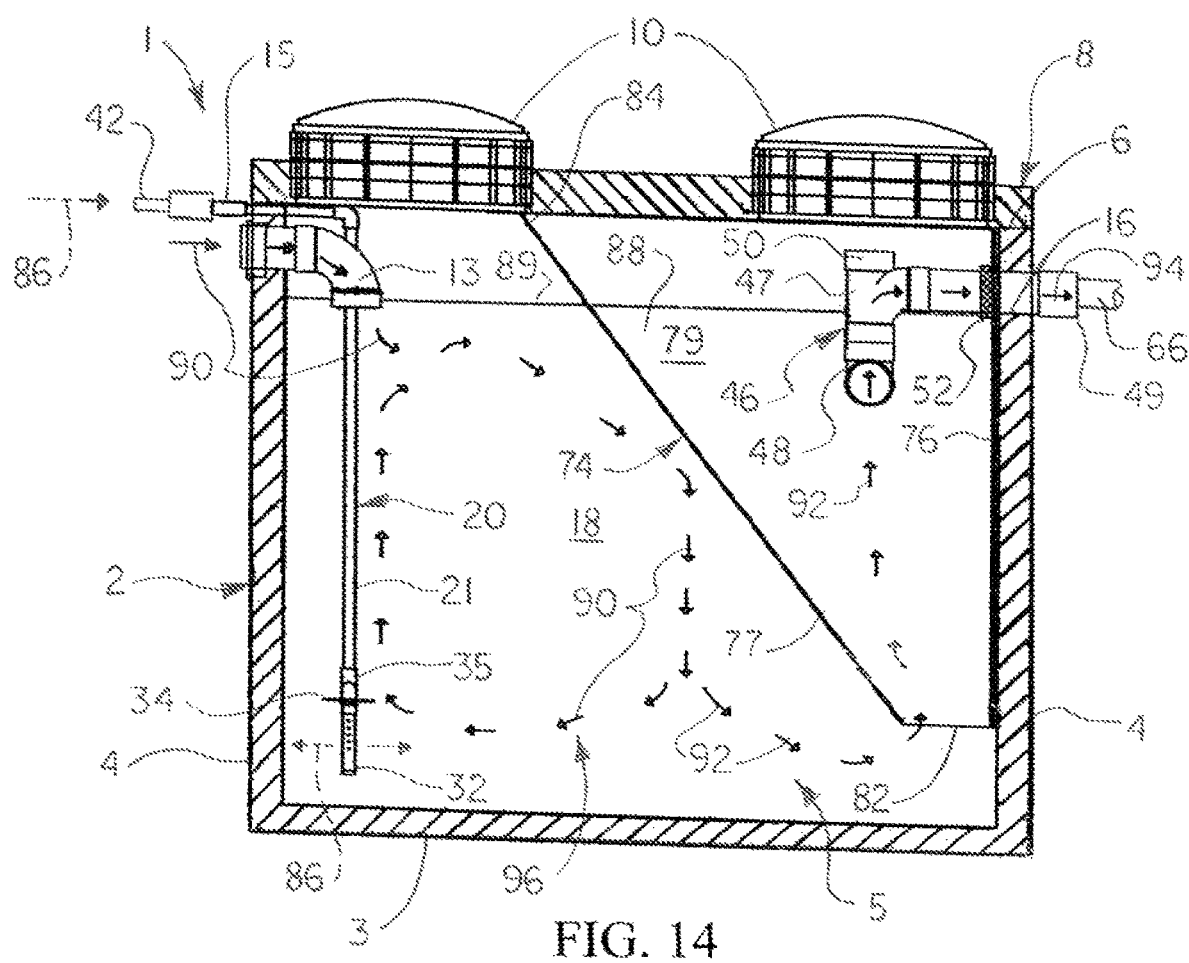
FIG. 14 is a vertical sectional view of the aerobic wastewater treatment system, more particularly illustrating flow of wastewater, mixed liquor and effluent through the treatment tank of the aerobic wastewater treatment system in typical application of the system.

Referring initially to FIGS. 13 and 14 of the drawings, an illustrative embodiment of the aerobic wastewater treatment systems is generally indicated by reference numeral 1. In typical application, which will be hereinafter described, the aerobic wastewater treatment system 1 may be provided in a wastewater treatment system 40 to aerobically treat wastewater 90 (FIG. 14). Accordingly, as illustrated in FIG. 13, in some applications, the aerobic wastewater treatment system 40 may include at least one pretreatment tank 62. In other applications, the pretreatment tank 62 may be omitted. The aerobic wastewater treatment system 1 may be provided in fluid communication with the pretreatment tank 62. In some applications, at least one posttreatment tank 64 may be provided in fluid communication with the aerobic wastewater treatment system 1.

The pretreatment tank 62 may receive raw sewage (not illustrated) from a municipal, home, business or other sewage system (not illustrated). The raw sewage may remain in the pretreatment tank 62 for a period of time to allow anaerobic microorganisms to begin processing the sewage. The resulting wastewater 90 from the pretreatment tank 62 may flow from the pretreatment tank 62 into the aerobic wastewater treatment system 1 through a pretreatment tank conduit 63. The aerobic wastewater treatment system 1 may separate solid waste particles from the wastewater 90, forming a liquid effluent 94 (FIG. 14). The effluent 94 may flow from the aerobic wastewater treatment system 1 into the posttreatment tank 64 for further processing through an effluent conduit 66.

Figure 3:
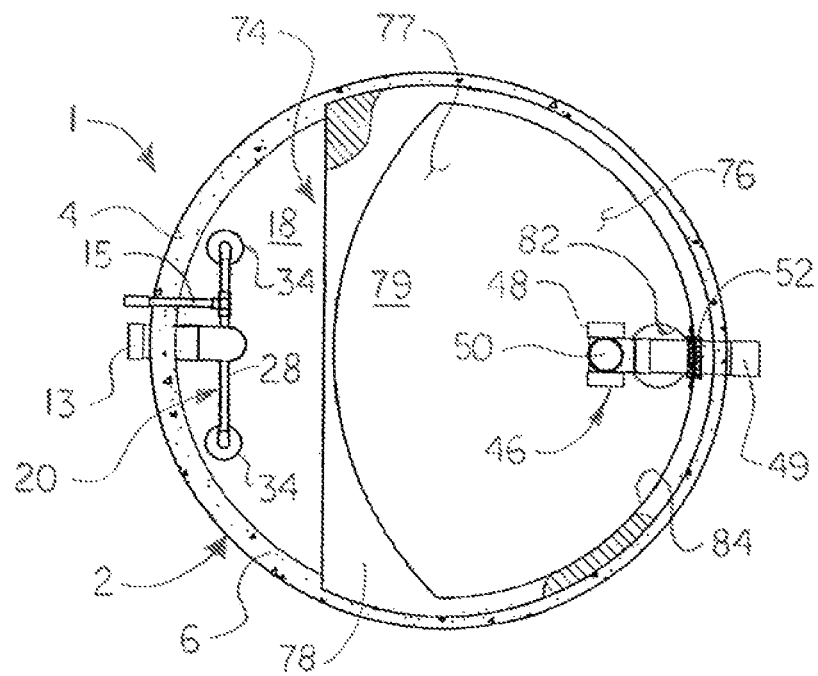
FIG. 3 is a top view of a typical treatment tank of the illustrative aerobic wastewater treatment system, with a tank cover (not illustrated) removed from the treatment tank to expose internal components of the tank.
Figure 4:
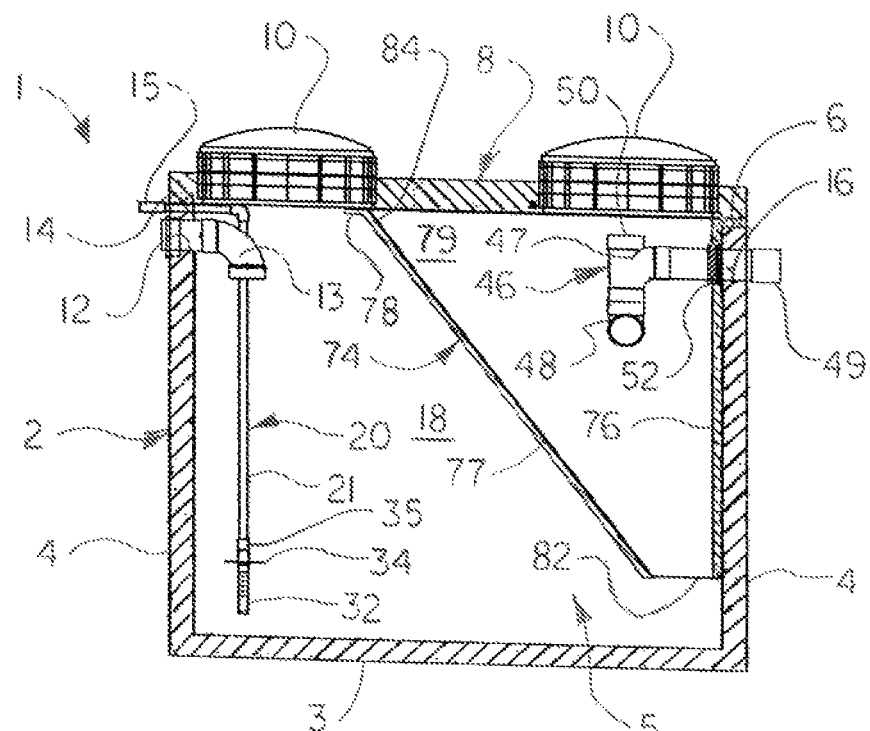
FIG. 4 is a vertical sectional view, taken along section lines 4-4 in FIG. 2, of the illustrative aerobic wastewater treatment system.
Figure 5:
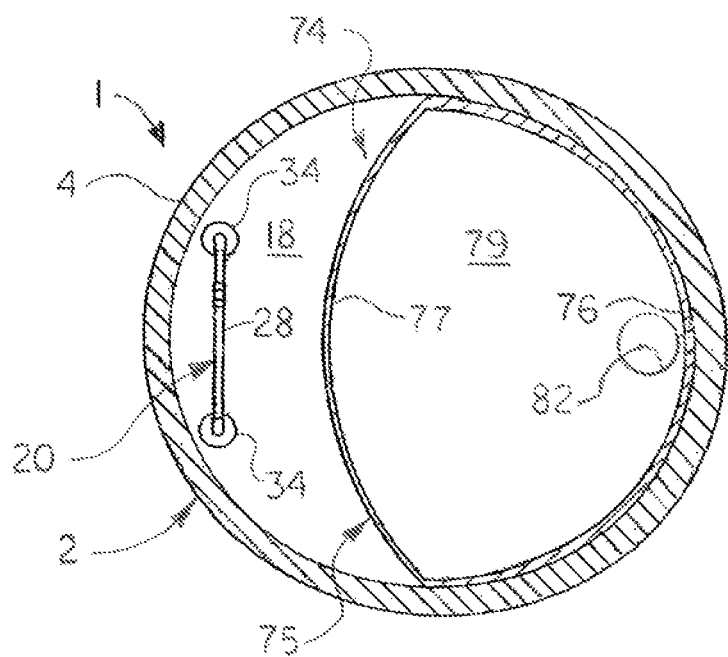
FIG. 5 is a horizontal sectional view, taken along section lines 5-5 in FIG. 1, of the illustrative aerobic wastewater treatment system.

Referring next to FIGS. 1-12 of the drawings, the aerobic wastewater treatment system 1 may include a treatment tank 2. The treatment tank 2 may include a tank bottom 3 and at least one tank sidewall 4 extending from the tank bottom 3. The tank sidewall 4 may have a tank sidewall edge 6. As illustrated in FIG. 4, a tank interior 5 may be formed by and between the tank bottom 3 and the tank sidewall 4.

A removable tank cover 8 may be provided on the tank sidewall edge 6 of the tank sidewall 4. At least one tank vent 10 may be provided in the tank cover 8 for ventilation purposes.

The tank bottom 3, the tank sidewall 4 and the tank cover 8 may be fabricated of fiberglass, concrete and/or other material or materials suitable for the purpose. In some embodiments, the tank sidewall 4 may be circular, round or oval. In other embodiments, the treatment tank 2 may have a polygonal shape with multiple tank sidewalls 4.

As illustrated in FIG. 4, a wastewater inlet conduit opening 12 may extend through the tank sidewall 4 typically beneath the tank sidewall edge 6. A wastewater inlet conduit 13 may extend through the wastewater inlet conduit opening 12 into the tank interior 5. An air inlet conduit opening 14 may extend through the tank sidewall 4 above the wastewater inlet conduit opening 12. An air inlet conduit 15 may extend through the air inlet conduit opening 14 into the tank interior 5. Alternatively, the air inlet conduit 15 may extend through a clearance (not illustrated) between the tank sidewall edge 6 and the tank cover 8. As illustrated in FIGS. 3 and 4, in some embodiments, the air inlet conduit 15 may be disposed above and to the side of the wastewater inlet conduit 13, as will be hereinafter described.

An effluent outlet conduit opening 16 may extend through the tank sidewall 4 typically beneath the tank sidewall edge 6. An effluent outlet conduit 46 may extend through the effluent outlet conduit opening 16. As illustrated in FIG. 3, in some embodiments, the effluent outlet conduit 46 may be positioned in diametrically-opposed relationship to the wastewater inlet conduit 13.

Figure 6:
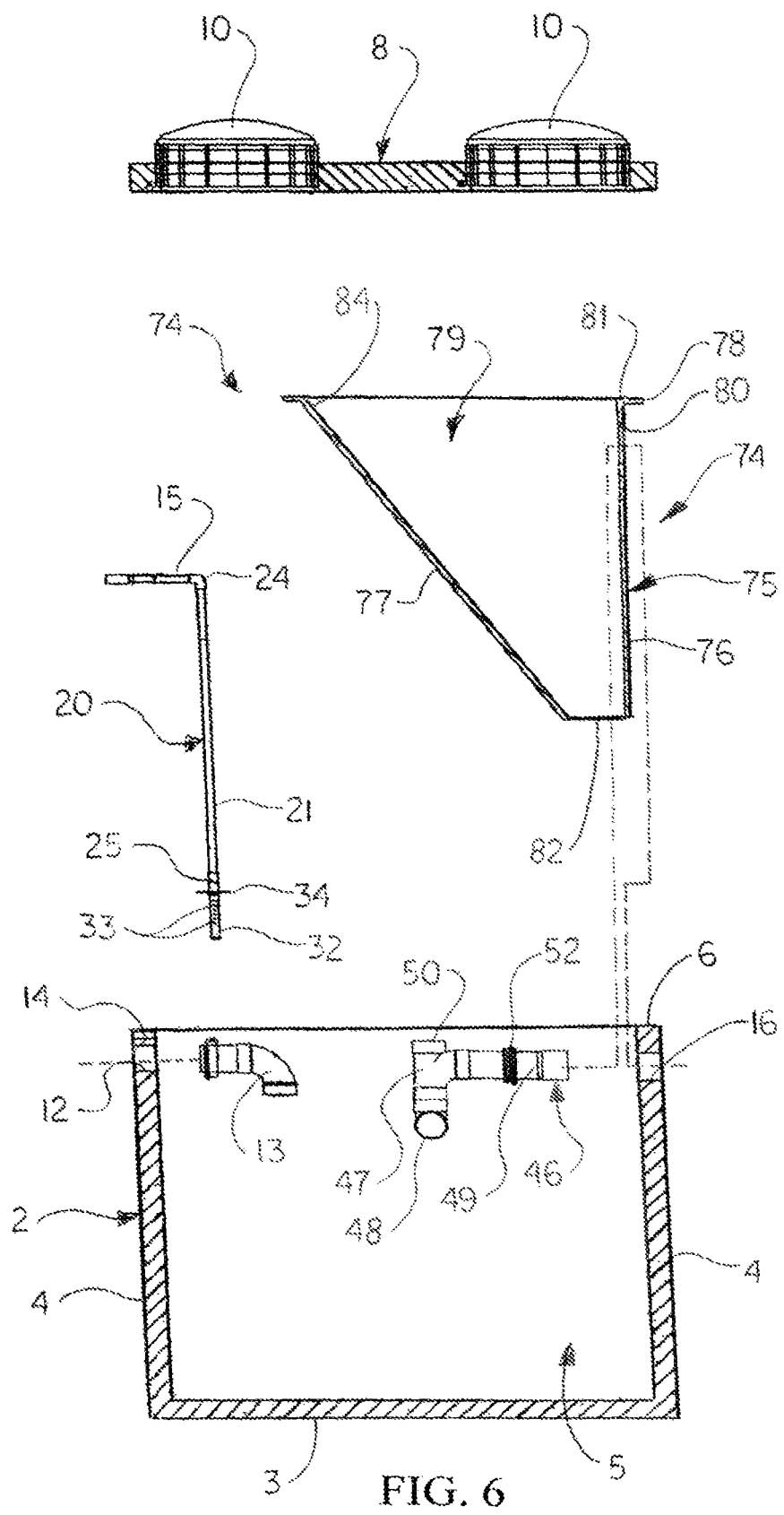
FIG. 6 is an exploded sectional view of the illustrative aerobic wastewater treatment system.
Figure 7:
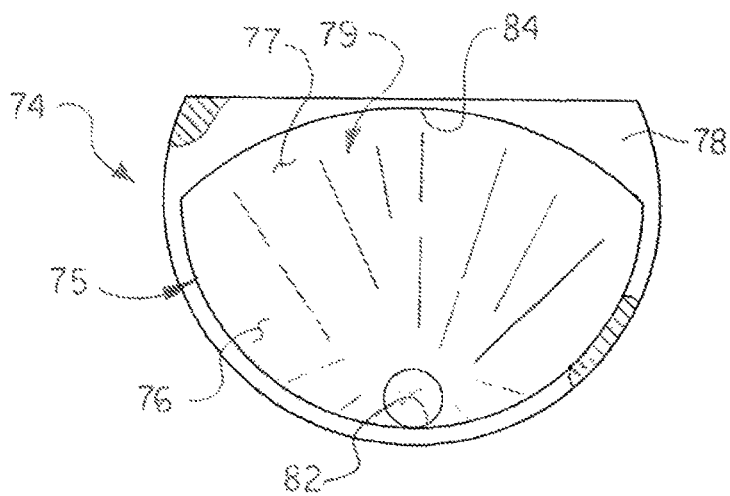
FIG. 7 is a top view of a typical clarifier of the illustrative aerobic wastewater treatment system.
Figure 8:
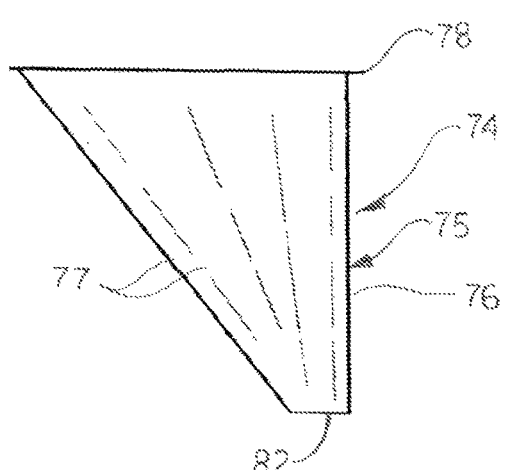
FIG. 8 is a side view of the clarifier illustrated in FIG. 7.
Figure 9:
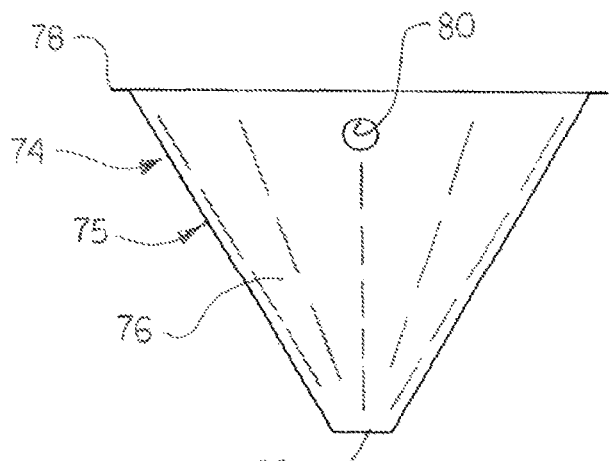
FIG. 9 is a front view of the clarifier illustrated in FIG. 7.

As illustrated in FIGS. 3-9, a clarifier 74 may be provided in the tank interior 5 of the treatment tank 2. The clarifier 74 may have a bottom clarifier inlet 82 and a top clarifier opening 84. As illustrated in FIGS. 3 and 7, in some embodiments, the clarifier opening 84 may be generally oval. As illustrated in FIGS. 7-9, the clarifier 74 may include a clarifier wall 75 which forms a clarifier interior 79 (FIG. 7) extending from the clarifier inlet 82 to the clarifier opening 84. As illustrated in FIG. 4, in some embodiments, the clarifier wall 75 may be generally conical, oval or oblique with an outside clarifier wall portion 76 and an inside clarifier wall portion 77. When the clarifier 74 is installed in the tank interior 5 of the treatment tank 2, the outside clarifier wall portion 76 may be disposed vertically, whereas the inside clarifier wall portion 77 may be disposed at an acute angle to the outside clarifier wall portion 76. Accordingly, from the clarifier inlet 82 to the clarifier opening 84, the inside clarifier wall portion 77 may extend or angle away from the outside clarifier wall portion 76. As further illustrated in FIG. 4, in some embodiments, the outside clarifier wall portion 76 of the clarifier 74 may extend adjacent or juxtaposed and parallel to and may engage the tank sidewall 4 of the treatment tank 2.

As illustrated in FIGS. 7-9, in some embodiments, a clarifier rim 78 may extend outwardly from an upper wall edge 81 (FIG. 6) of the clarifier wall 75 of the clarifier 74 at the clarifier opening 84. As illustrated in FIG. 6, in typical installation of the clarifier 74 into the tank interior 5 of the treatment tank 2, the clarifier rim 78 may be lowered to rest on the tank sidewall edge 6 of the treatment tank 2 to support the clarifier 74 in the tank interior 5 of the treatment tank 2.

As further illustrated in FIG. 4, the inside wall portion 77 of the clarifier 74 may partition or divide the tank interior 5 of the treatment tank 2 into an aeration chamber 18 and the clarifier interior 79 of the clarifier 74. Accordingly, the clarifier inlet 82 may establish fluid communication between the aeration chamber 18 in the tank interior 5 and the clarifier interior 79 of the clarifier 74. The clarifier inlet 82 may be disposed at a selected height or spacing with respect to the tank bottom 3 of the treatment tank 2. In some embodiments, the clarifier inlet 82 may be disposed at a height or spacing of about 10 inches with respect to the tank bottom 3. In alternative embodiments, the spacing between the clarifier inlet 82 and the tank bottom 3 may be lesser or greater than 10 inches. The wastewater inlet conduit 13 may be disposed in fluid communication with the aeration chamber 18, whereas the effluent outlet conduit 46 may be disposed in fluid communication with the clarifier interior 79. An effluent outlet conduit opening 80 (FIG. 9) may extend through the outside wall portion 76 of the clarifier wall 75 to accommodate the effluent outlet conduit 46 as it extends from the clarifier interior 79 through the tank sidewall 4. A conduit seal 52 may seal the effluent outlet conduit 46 as it extends through the effluent outlet conduit. In some embodiments, the clarifier inlet 82 of the clarifier 74 may be disposed substantially directly beneath the effluent outlet conduit 46.

As illustrated in FIGS. 3 and 4, in some embodiments, the effluent outlet conduit 46 may include a T-baffle 47 having an inlet portion 48 in the clarifier interior 79 and an outlet portion 49 which extends through the conduit seal 52, the effluent conduit opening 80 in the outside wall portion 76 of the clarifier 74 and the registering effluent outlet conduit opening 16 in the tank sidewall 4, as illustrated in FIG. 6. A removable cap 50 may be provided on the inlet portion 48 to facilitate periodic removal of solid impurities from the effluent outlet conduit 46 as deemed necessary.

Referring again to FIGS. 4 and 6 of the drawings, it will be appreciated by those skilled in the art that in some embodiments of the aerobic wastewater treatment system 1, the clarifier 74 may be installed in the tank interior 5 of the treatment tank 2 with the outside wall portion 76 of the clarifier 74 juxtaposed to or abutting against and engaging the interior surface of the tank sidewall 4. This expedient may facilitate more precise registration of the effluent conduit opening 80 in the outside wall portion 76 of the clarifier wall 75 with the effluent outlet conduit opening 16 in the tank sidewall 4, and consequently, alignment of the outlet portion 49 of the effluent outlet conduit 46 with the effluent conduit opening 80 and effluent outlet conduit opening 16. Accordingly, the effluent outlet conduit 46 may be disposed in precise positioning in the clarifier interior 79 for optimal operation of the aerobic wastewater treatment system 1, as will be hereinafter further described.

Figure 10:
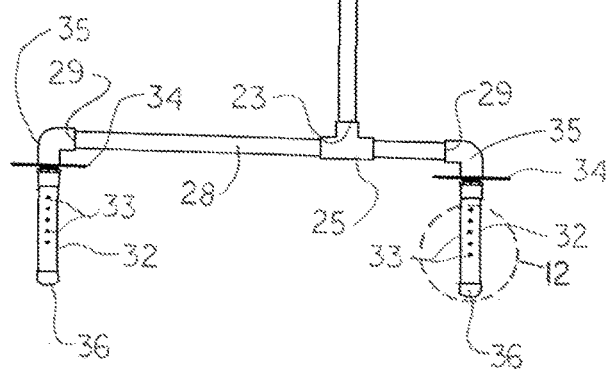
FIG. 10 is a front view of a typical diffuser of the illustrative aerobic wastewater treatment system.
Figure 11:
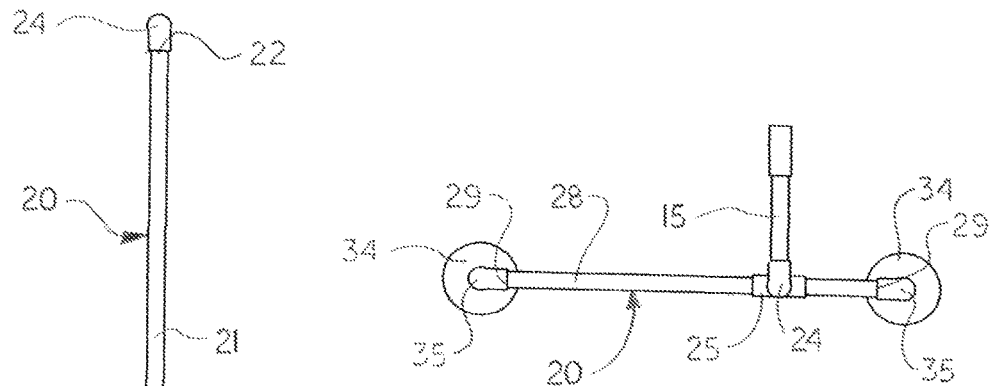
FIG. 11 is a top view of the diffuser illustrated in FIG. 10.
Figure 12:
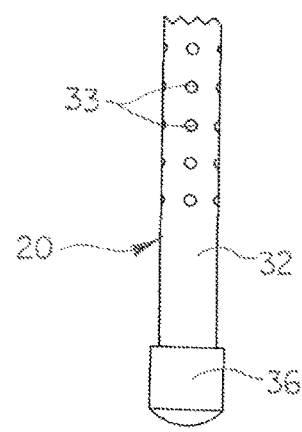
FIG. 12 is an enlarged sectional view, taken along section line 12 in FIG. 10, of a typical diffuser discharge conduit of the diffuser.

As illustrated in FIGS. 3-6 and 10-12, a diffuser 20 may be provided in the aeration chamber 18 of the tank interior 5. As illustrated in FIGS. 3 and 4, the diffuser 20 and the clarifier 74 may be disposed in spaced-apart relationship to each other on opposite sides of the tank interior 5. The diffuser 20 may include an elongated vertical diffuser conduit 21. As illustrated in FIG. 10, the vertical diffuser conduit 21 may have a diffuser conduit inlet end 22 and a diffuser conduit outlet end 23. The diffuser conduit inlet end 22 may be disposed in fluid communication with the air inlet conduit 15 via an elbow fitting 24.

An elongated horizontal diffuser conduit 28 may be disposed in fluid communication with the vertical diffuser conduit 21. As further illustrated in FIG. 10, the horizontal diffuser conduit 28 may have a pair of opposite diffuser conduit outlet ends 29. The horizontal diffuser conduit 28 may be connected to the diffuser conduit outlet end 23 of the vertical diffuser conduit 21 between the diffuser conduit outlet ends 29 via a tee fitting 25.

As further illustrated in FIG. 10, at least one diffuser discharge conduit 32 may be disposed in fluid communication with the horizontal diffuser conduit 28. In some embodiments, a pair of spaced-apart, parallel diffuser discharge conduits 32 may be disposed in fluid communication with the respective diffuser conduit outlet ends 29 via respective tee fittings 35. A disk 34 may be provided between each tee 35 and the corresponding diffuser discharge conduit 32. Each diffuser discharge conduit 32 may have at least one discharge opening 33. A conduit cap 36 may close a distal or extending end of each diffuser discharge conduit 32.

As further illustrated in FIG. 10, in some embodiments, the horizontal diffuser conduit 28 may be disposed off-center with respect to the vertical diffuser discharge conduit 21, and the tee fitting 25 which connects the horizontal diffuser conduit 28 to the vertical diffuser discharge conduit 21 may be closer to one than the other of the diffuser conduit outlet ends 29. Accordingly, the diffuser discharge conduits 32 may be offset with respect to the vertical diffuser discharge conduit 21. Thus, as illustrated in FIG. 3, the wastewater inlet conduit 13 may be disposed above and substantially equidistant between the diffuser discharge conduits 32 (FIG. 4) of the diffuser 20.

Referring again to FIGS. 13 and 14 of the drawings, in typical application, the aerobic wastewater treatment system 1 may be installed in the wastewater treatment system 40 to aerobically treat wastewater 90 (FIG. 14) from the pretreatment tank 62. Accordingly, the wastewater inlet conduit 13 (FIG. 14) of the aerobic wastewater treatment system 1 may be coupled to the pretreatment tank conduit 63 (FIG. 13) which extends from the pretreatment tank 62. In some applications, at least one posttreatment tank 64 may be coupled to the outlet portion 49 of the effluent outlet conduit 46 typically through the effluent conduit 66 (FIG. 13). As illustrated in FIG. 13, an aerator 41 may be coupled to the air inlet conduit 15 of the aerobic wastewater treatment system 1 through an air delivery line 42.

In typical operation of the water treatment system 40, a supply of water 88 may be placed in the tank interior 5 of the treatment tank 2. A quantity of water 88 may be placed in the tank interior 5 until the water 88 reaches a water line 89 typically just above the discharge of the wastewater inlet conduit 13. The water 88 may fill the aeration chamber 18 and flow into the clarifier interior 79 of the clarifier 74 until the water 88 reaches the water line 89. Simultaneously, air 86 may be distributed from the aerator 41 through the air delivery line 42 and air inlet conduit 15, respectively. The air 86 may flow from the air inlet conduit 15 through the vertical diffuser conduit 21, the horizontal diffuser conduit 28 and the diffuser discharge conduits 32, respectively, from which the air 86 may be discharged into the water 88 through the discharge openings 33. The air 86 aerates and dissolves in the water 88 in the aeration chamber 18.

Raw sewage (not illustrated) may flow into the pretreatment tank 62 from a municipal, home, business or other sewage system (not illustrated). Microorganisms in the pretreatment tank 62 may break down the sewage into solid byproducts, forming pretreated wastewater 90. The wastewater 90 from the pretreatment tank 62 may flow from the pretreatment tank 62 through the pretreatment tank conduit 63 (FIG. 13) into the wastewater inlet conduit 13 (FIG. 14), and into the water 88 in the aeration chamber 18 through the wastewater inlet conduit 13.

As it enters the water 88 in the aeration chamber 18, the wastewater 90 includes water and solid waste particles. Accordingly, due typically to the flow of air 86 from the diffuser discharge conduits 32 of the diffuser 20, the wastewater 90 may repeatedly flow in a continuous circulation loop 96 in the aeration chamber 18 from the wastewater inlet conduit 13, across toward the inside wall portion 77 of the clarifier wall 75, downwardly toward the tank bottom 3 of the treatment tank 2, toward the diffuser discharge conduits 32 of the diffuser 20, and upwardly along or adjacent to the vertical diffuser conduit 21, respectively. As it flows throughout the circulation loop 96, solids (not illustrated) may settle out of the wastewater 90 onto the tank bottom 3. The resulting mixed liquor 92, which includes mostly liquid and some solids, may flow from the circulation loop 96, through the clarifier inlet 82 and into the clarifier interior 79 of the clarifier 74. As the mixed liquor 92 rises in the clarifier interior 79, solids which remain may settle out of the mixed liquor 92, fall through the clarifier inlet 82 and return to the circulation loop 96 in the aeration zone 18 for further treatment, and the process may continue. The resulting effluent 94 which reaches the upper portion of the clarifier interior 79 is substantially free of solids and may enter the effluent outlet conduit 46 through the inlet portions 48. The effluent 94 may flow from the effluent outlet conduit 46 through the outlet portion 49 and into the postreatment tank 64 through the effluent conduit 66 (FIG. 13) for further processing according to the knowledge of those skilled in the art.

Throughout use, the aerobic wastewater treatment system 1 may require periodic maintenance, inspection and servicing. Accordingly, the tank cover 8 may be removed from the tank sidewall edge 8 to expose the aeration chamber 18 and the clarifier interior 79 of the clarifier 74. It will be appreciated by those skilled in the art that the typically oval shape of the clarifier opening 84 facilitates thorough inspection of the clarifier interior 79 as well as pumping of solids from the clarifier interior 79, as needed, through the clarifier opening 84.

It will be further appreciated by those skilled in the art that in some embodiments, the waste water inlet conduit 13 may enter the tank interior 5 of the treatment tank 2 above and between the diffuser discharge conduits 32 of the diffuser 20. This expedient may facilitate more thorough mixing of the aerated water 88 and wastewater 90 in the aeration chamber 18, resulting in more efficient and complete separation of the solids from liquids in the aeration zone 18.

Referring again to FIG. 6 of the drawings, a typical method of fabricating the aerobic wastewater treatment system 1 may include initial fabrication of the aerobic treatment tank 2 and tank cover 8 using conventional pouring, molding, casting, machining and/or other techniques known by those skilled in the art. The air inlet conduit 15 may be installed in the tank sidewall 4 of the treatment tank 2 from outside the tank interior 5. The diffuser 20 may be installed in the tank interior 5 from outside the treatment tank 2 by coupling the vertical diffuser conduit 21 to the air inlet conduit 15 typically at the elbow fitting 24. The wastewater inlet conduit 13 may be installed in the wastewater inlet conduit opening 12 from outside the tank interior 5. In some embodiments, the wastewater treatment conduit 13 may be disposed above and substantially equidistant between the pair of diffuser discharge conduits 32 of the diffuser 20.

The clarifier 74 may be lowered into place in the tank interior 5 as the outside wall portion 76 of the clarifier wall 75 is typically placed against the interior surface of the tank sidewall 4 until the clarifier rim 78 on the clarifier wall 75 is lowered to rest on the tank sidewall edge 6 of the tank sidewall 4 and the effluent conduit opening 80 in the outside wall portion 76 simultaneously aligns or registers with the effluent outlet conduit opening 16 in the tank sidewall 4 of the treatment tank 2. The outlet portion 49 of the effluent outlet conduit 46 may next be extended through the registering effluent conduit opening 80 and effluent outlet conduit opening 16 typically from inside the clarifier interior 79 until the conduit seal 52 seats in the effluent conduit opening 80. Alternatively, the conduit seal 52 may be installed in the effluent conduit opening 80 prior to installation of the effluent outlet conduit 46. The aerobic wastewater treatment system 1 may then be installed in the water treatment system 40 typically as was heretofore described with respect to FIG. 13.

Figure 15:
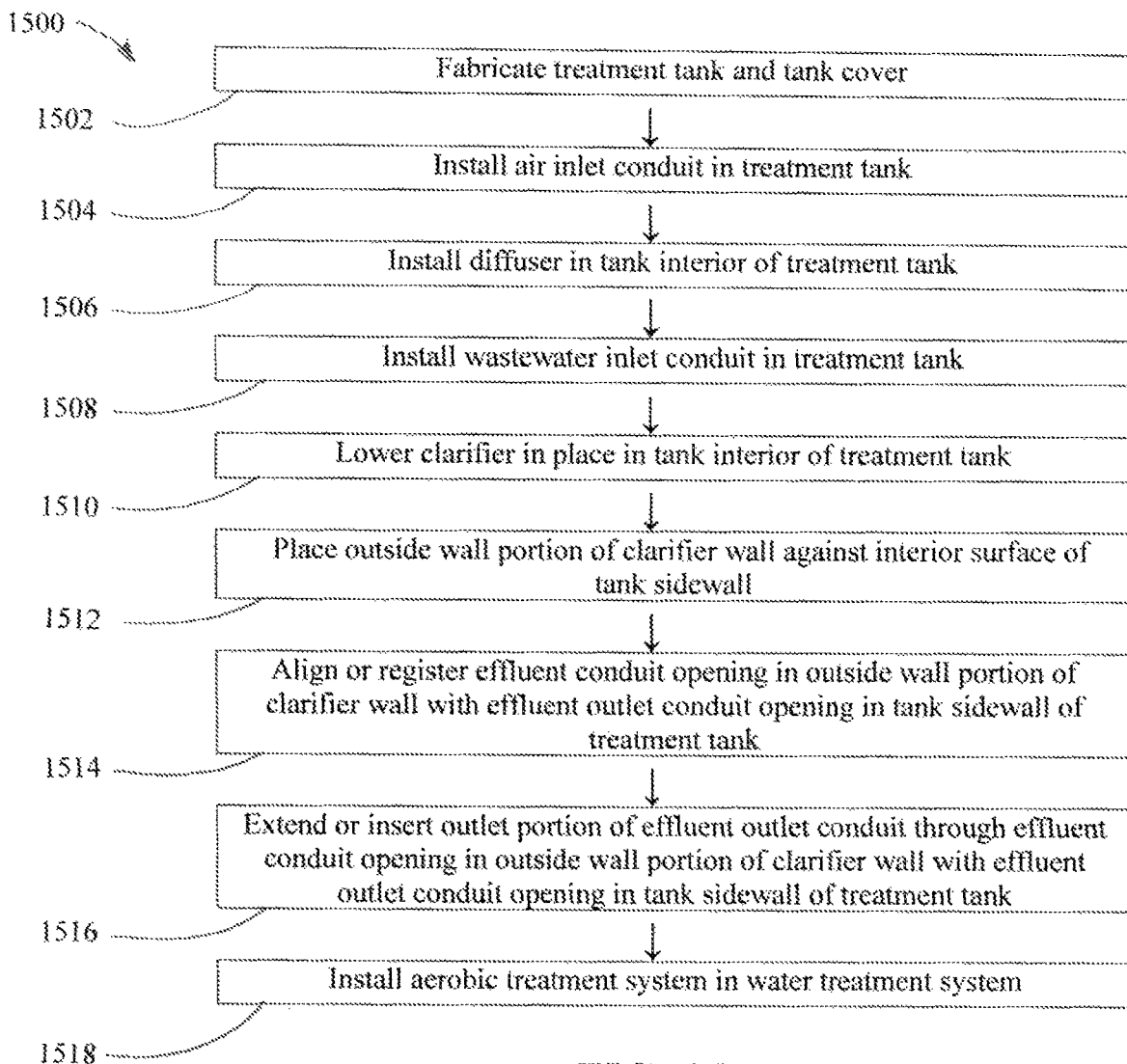
FIG. 15 is a flow diagram of an illustrative embodiment of the aerobic wastewater treatment system fabrication methods.
Figure 16:
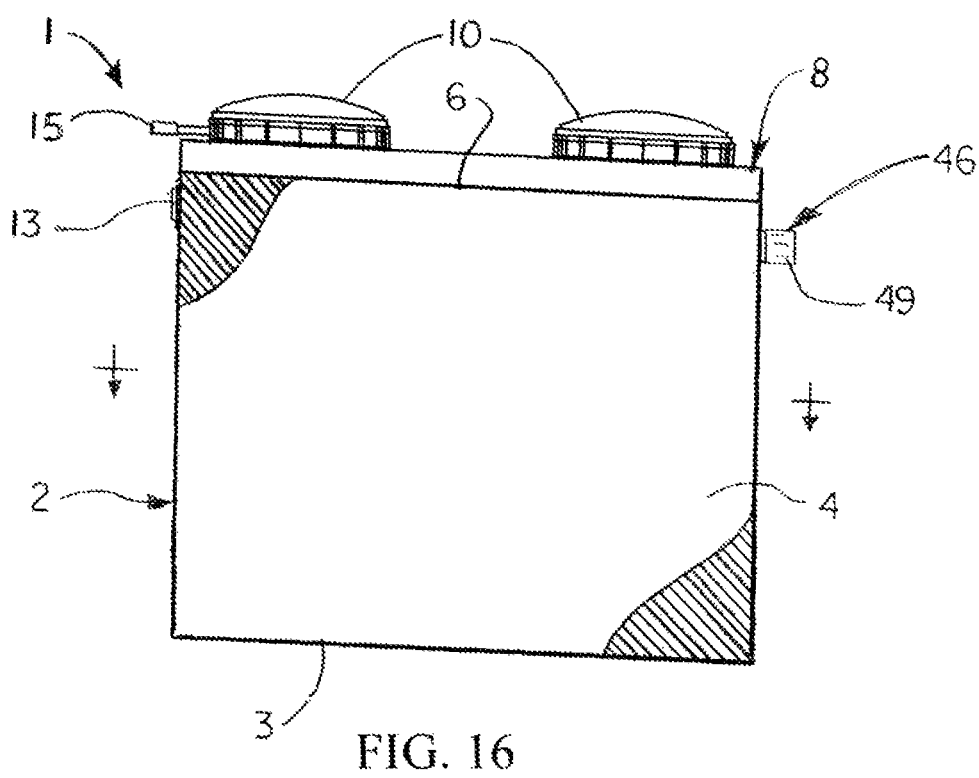
FIG. 16 is a side view of an illustrative embodiment of the aerobic wastewater treatment systems in which the air inlet conduit extends into the aeration chamber through a tank vent on the tan cover.
Figure 17:
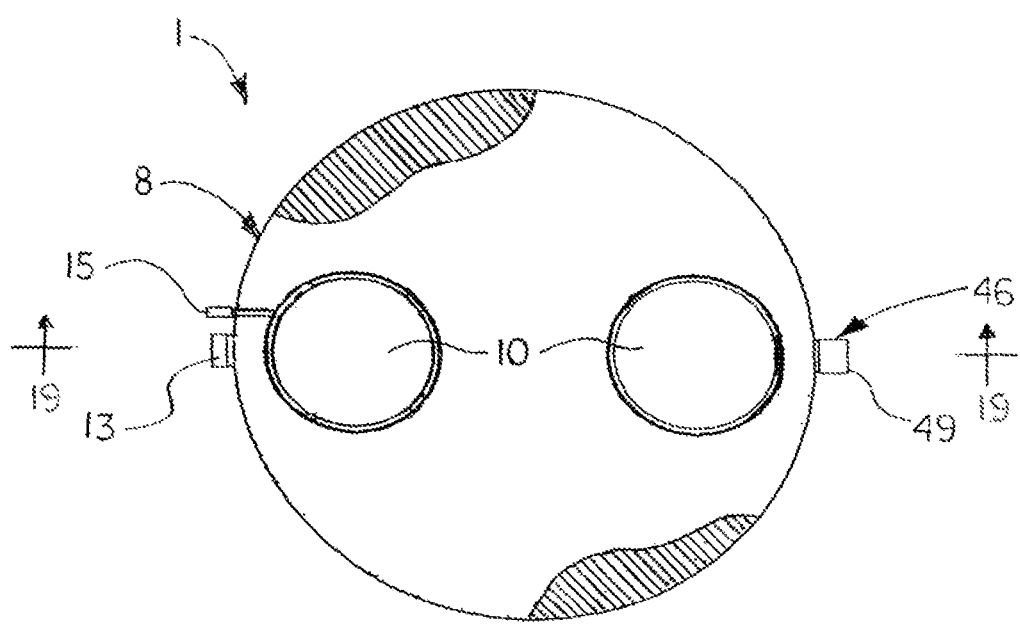
FIG. 17 is a top view of the illustrative aerobic wastewater treatment system illustrated in FIG. 16.
Figure 18:
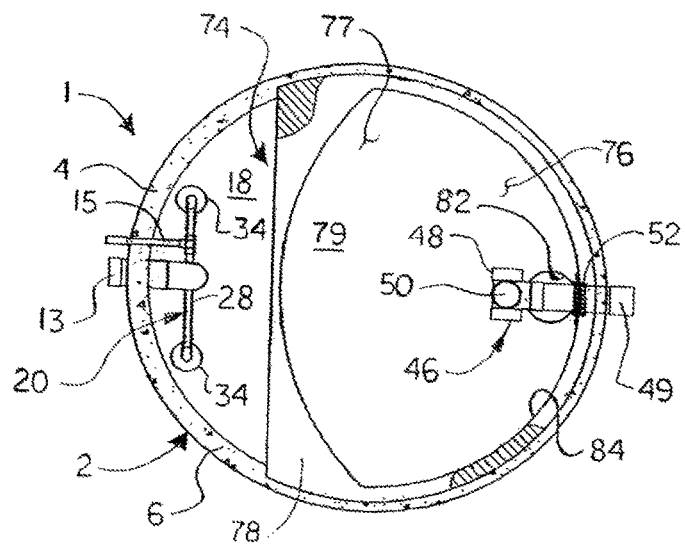
FIG. 18 is a top view of a typical treatment tank of the illustrative aerobic wastewater treatment system illustrated in FIG. 16, with a tank cover (not illustrated) removed from the treatment tank to expose internal components of the tank.
Figure 19:
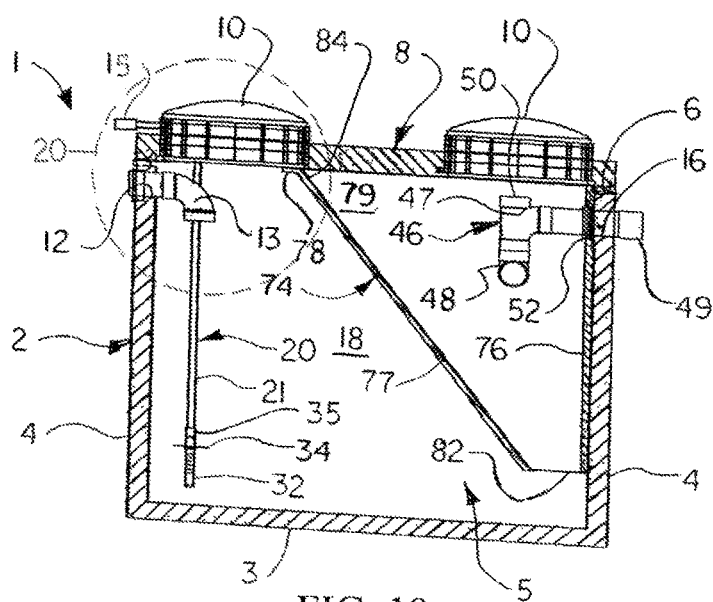
FIG. 19 is a vertical sectional view, taken along section lines 19-19 in FIG. 17, of the illustrative aerobic wastewater treatment system.
Figure 20:
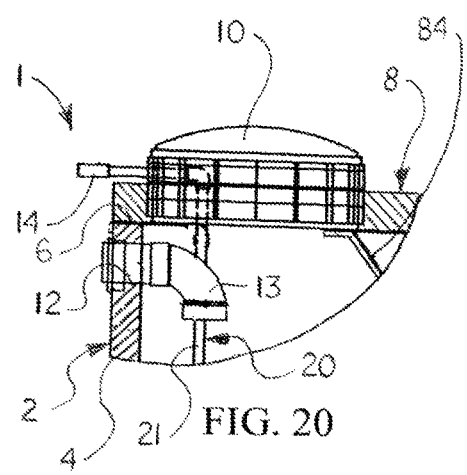
FIG. 20 is an enlarged sectional view, taken along section line 20 in FIG. 19.

Referring next to FIG. 15 of the drawings, a flow diagram 1500 of an illustrative embodiment of the aerobic wastewater treatment system fabrication methods is illustrated. At Step 1502, a treatment tank and a treatment tank cover may be fabricated. At Step 1504, an air inlet conduit may be installed in the treatment tank. At Step 1506, a diffuser may be installed in the tank interior of the treatment tank. In some embodiments, the diffuser may be installed in the tank interior from outside the treatment tank. At Step 1508, a wastewater inlet conduit may be installed in the treatment tank. In some embodiments, the wastewater inlet conduit may be disposed above and substantially equidistant between a pair of diffuser discharge conduits of the diffuser.

At Step 1510, a clarifier may be lowered in place in the tank interior of the treatment tank. In some embodiments, a clarifier rim on the clarifier may be lowered to rest on a tank sidewall edge of a tank sidewall of the treatment tank. At Step 1512, in some embodiments, an outside wall portion of the clarifier wall may be placed against an interior surface of the tank sidewall of the treatment tank. At Step 1514, an effluent conduit opening in the outside wall portion of the clarifier wall may be aligned with an effluent outlet conduit opening in the tank sidewall of the treatment tank typically as the clarifier rim on the clarifier wall of the clarifier is lowered to rest on the tank sidewall edge of the tank sidewall. At Step 1516, an outlet portion of an effluent outlet conduit may be extended or inserted through the effluent conduit opening in the outside wall portion of the clarifier wall and the registering effluent conduit opening in the tank sidewall of the treatment tank. At Step 1518, the aerobic wastewater treatment system may be subsequently installed in a water treatment system.

Referring next to FIGS. 16-20 of the drawings, in some embodiments of the aerobic treatment system 1, the air inlet conduit 13 may be routed through an air inlet conduit opening (not illustrated) in one of the tank vents 10 on the tank cover 8, or elsewhere through the tank cover 8 according to the knowledge of those skilled in the art. Accordingly, the wastewater inlet conduit opening 12 may be omitted from the tank sidewall 4 of the treatment tank 2. Application of the aerobic treatment system 1 may be as was heretofore described with respect to FIGS. 13 and 14.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. An aerobic wastewater treatment system, comprising:
   a treatment tank having a tank interior;
   an aeration chamber in the tank interior;
   a wastewater inlet conduit disposed in fluid communication with the aeration chamber;
   an air inlet conduit disposed in fluid communication with the aeration chamber;
   a diffuser in the aeration chamber, the diffuser including:
   a vertical diffuser conduit disposed in pneumatic communication with the air inlet conduit, the vertical diffuser conduit extending to one side of the wastewater inlet conduit;
   an elongated horizontal diffuser conduit disposed in fluid communication with the vertical diffuser conduit, the horizontal diffuser conduit disposed longitudinally off-center with respect to the vertical diffuser conduit and having a pair of opposite diffuser conduit outlet ends, the vertical diffuser conduit being closer to one than the other of the diffuser conduit outlet ends;
   at least one diffuser discharge conduit disposed in fluid communication with the horizontal diffuser conduit at at least one of the diffuser conduit outlet ends;
   at least one discharge opening in the at least one diffuser discharge conduit; and the wastewater inlet conduit discharges directly above the horizontal diffuser conduit and in-plane with and to a side of the at least one diffuser discharge conduit of the diffuser in the tank interior of the treatment tank;

a clarifier in the tank interior, the clarifier including:
   a vertical outside clarifier wall portion;
   an inside clarifier wall portion disposed at an acute angle to the outside clarifier wall portion;
   a clarifier interior formed by and between the outside clarifier wall portion and the inside clarifier wall portion; and
   a clarifier inlet establishing fluid communication between the aeration chamber and the clarifier interior; and
an effluent outlet conduit disposed in fluid communication with the clarifier interior.

2. The aerobic wastewater treatment system of claim 1 wherein the treatment tank comprises a tank bottom, a tank sidewall extending from the tank bottom and a vented tank cover on the tank sidewall, and the tank interior is formed by and between the tank bottom and the tank sidewall.

3. The aerobic wastewater treatment system of claim 2 further comprising a clarifier rim extending from the outside clarifier wall portion and the inside clarifier wall portion of the clarifier, and wherein the clarifier rim normally rests on the tank sidewall of the treatment tank.

4. The aerobic wastewater treatment system of claim 1 wherein the clarifier inlet of the clarifier is substantially directly beneath the effluent outlet conduit.

5. The aerobic wastewater treatment system of claim 1 wherein the at least one discharge opening in the at least one diffuser discharge conduit comprises a plurality of discharge openings in the at least one diffuser discharge conduit.

6. The aerobic wastewater treatment system of claim 5 wherein the at least one diffuser discharge conduit comprises a pair of spaced-apart diffuser discharge conduits.

7. The aerobic wastewater treatment system of claim 6 wherein the effluent outlet conduit is positioned in diametrically-opposed relationship to the wastewater inlet conduit.

8. The aerobic wastewater treatment system of claim 1 further comprising a conduit cap closing a distal or extending end of the at least one diffuser discharge conduit and a disk provided between the horizontal diffuser conduit and the at least one diffuser discharge conduit.

9. The aerobic wastewater treatment system of claim 1 wherein the clarifier comprises an oval clarifier opening communicating with the clarifier interior.

10. An aerobic wastewater treatment system, comprising:
a treatment tank having a tank interior;
an aeration chamber in the tank interior;
an air inlet conduit disposed in fluid communication with the aeration chamber;
a diffuser in the aeration chamber, the diffuser including:
   a vertical diffuser conduit disposed in fluid communication with the air inlet conduit;
   an elongated horizontal diffuser conduit disposed in fluid communication with the vertical diffuser conduit, the horizontal diffuser conduit disposed longitudinally off-center with respect to the vertical diffuser conduit and having a pair of opposite diffuser conduit outlet ends, the vertical diffuser conduit being closer to one than the other of the diffuser conduit outlet ends;
   a pair of spaced-apart diffuser discharge conduits disposed in fluid communication with the horizontal diffuser conduit at the diffuser conduit outlet ends, respectively;
   at least one discharge opening in each of the diffuser discharge conduits; and
   the wastewater inlet conduit discharges directly above the horizontal diffuser discharge conduit and in-plane with and between the diffuser discharge conduits of the diffuser in the tank interior of the treatment tank;
a wastewater inlet conduit disposed in fluid communication with the aeration chamber, the wastewater inlet conduit disposed above and substantially equidistant between the diffuser discharge conduits of the diffuser and extending to one side of the vertical diffuser conduit;
a clarifier in the tank interior, the clarifier including:
   a clarifier interior, and
   a clarifier inlet establishing fluid communication between the aeration chamber and the clarifier interior, and
an effluent outlet conduit disposed in fluid communication with the clarifier interior of the clarifier.

11. The aerobic wastewater treatment system of claim 10 wherein the treatment tank comprises a tank bottom, a tank sidewall extending from the tank bottom and a vented tank cover on the tank sidewall, and the tank interior is formed by and between the tank bottom and the tank sidewall.

12. The aerobic wastewater treatment system of claim 11 wherein the clarifier comprises an outside clarifier wall portion and an inside clarifier wall portion, and further comprising a clarifier rim extending from the outside clarifier wall portion and the inside clarifier wall portion of the clarifier, and wherein the clarifier rim normally rests on the tank sidewall of the treatment tank.

13. The aerobic wastewater treatment system of claim 10 further comprising a conduit cap closing a distal or extending end of each of the diffuser discharge conduits and a disk provided between the horizontal diffuser conduit and each corresponding one of the diffuser discharge conduits.

14. The aerobic wastewater treatment system of claim 10 wherein the clarifier inlet of the clarifier is substantially directly beneath the effluent outlet conduit.

15. The aerobic wastewater treatment system of claim 10 wherein the clarifier comprises an oval clarifier opening communicating with the clarifier interior.

16. The aerobic wastewater treatment system of claim 10 wherein the clarifier comprises a vertical outside clarifier wall portion and an inside clarifier wall portion disposed at an acute angle to the outside clarifier wall portion, and the clarifier interior is formed by and between the outside clarifier wall portion and the inside clarifier wall portion.

17. An aerobic wastewater treatment system, comprising:
a treatment tank including:
   a tank bottom;
   a tank sidewall extending from the tank bottom;
   an effluent outlet conduit opening in the tank sidewall;
   a tank interior formed by the tank bottom and the tank sidewall; and
   a vented tank cover on the tank sidewall;
an aeration chamber in the tank interior an air inlet conduit disposed in fluid communication with the aeration chamber;
a diffuser in the aeration chamber, the diffuser including:
   a vertical diffuser conduit disposed in fluid communication with the air inlet conduit;

an elongated horizontal diffuser conduit disposed in fluid communication with the vertical diffuser conduit, the horizontal diffuser conduit disposed longitudinally off-center with respect to the vertical diffuser discharge conduit and having a pair of opposite diffuser conduit discharge ends, the vertical diffuser conduit being closer to one than the other of the diffuser conduit outlet ends;

a pair of spaced-apart diffuser discharge conduits disposed in fluid communication with the horizontal diffuser conduit, the diffuser discharge conduits offset with respect to the vertical diffuser discharge conduit;

at least one discharge opening in each of the diffuser discharge conduits; and the wastewater inlet conduit discharges directly above the horizontal diffuser conduit and in-plane with and between the diffuser discharge conduits of the diffuser in the tank interior of the treatment tank;

a wastewater inlet conduit disposed in fluid communication with the aeration chamber, the wastewater inlet conduit disposed above and substantially equidistant between the diffuser discharge conduits of the diffuser and extending to one side of the vertical diffuser conduit;

a clarifier in the tank interior, the clarifier including:

a vertical outside clarifier wall portion extending adjacent and parallel to and engaging the tank sidewall of the treatment tank;

an effluent conduit opening in the outside clarifier wall portion and registering with the effluent outlet conduit opening in the tank sidewall of the treatment tank;

an inside clarifier wall portion disposed at an acute angle to the outside clarifier wall portion;

a clarifier interior formed by and between the outside clarifier wall portion and the inside clarifier wall portion, the inside clarifier wall portion separating the aeration chamber from the clarifier interior; and a clarifier inlet establishing fluid communication between the aeration chamber and the clarifier interior, and an effluent outlet conduit disposed in fluid communication with the clarifier interior of the clarifier and extending through the effluent conduit opening and the effluent outlet conduit opening.

18. The aerobic wastewater treatment system of claim 17 wherein the clarifier inlet of the clarifier is substantially directly beneath the effluent outlet conduit.

19. The aerobic wastewater treatment system of claim 17 wherein the clarifier comprises an oval clarifier opening opposite the clarifier inlet.

20. The aerobic wastewater treatment system of claim 17 further comprising a clarifier rim extending from the outside clarifier wall portion and the inside clarifier wall portion of the clarifier, and wherein the clarifier rim normally rests on the tank sidewall of the treatment tank.

* * * * *